United States Patent
Carsello

(10) Patent No.: US 6,625,233 B1
(45) Date of Patent: Sep. 23, 2003

(54) METHOD AND APPARATUS IN A WIRELESS RECEIVER FOR DEMODULATING A CONTINUOUS-PHASE FREQUENCY-SHIFT-KEYED SIGNAL

(75) Inventor: Stephen Rocco Carsello, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,398

(22) Filed: Sep. 29, 1999

(51) Int. Cl.[7] .............................................. H04L 27/14
(52) U.S. Cl. ....................................... 375/334; 375/232
(58) Field of Search ................................. 375/334, 232, 375/229, 227, 142, 340, 346, 260, 336, 149; 358/167; 370/465; 455/323

(56) References Cited

U.S. PATENT DOCUMENTS

| | | | |
|---|---|---|---|
| 5,796,787 A | 8/1998 | Chen et al. | 375/326 |
| 5,832,038 A | 11/1998 | Carsello | 375/316 |
| 5,909,465 A * | 6/1999 | Bottomley et al. | 370/333 |
| 6,032,048 A * | 2/2000 | Hartless et al. | 455/312 |
| 6,347,127 B1 | 2/2002 | Chen | |

* cited by examiner

Primary Examiner—Stephen Chin
Assistant Examiner—Curtis Odom
(74) Attorney, Agent, or Firm—Matthew C. Loppnow; R. Louis Breeden

(57) ABSTRACT

A demodulator (604) demodulates (802) a block of symbols of a signal through a single-symbol matched-filter technique, thereby generating a first set of data; and demodulates (804) the block of symbols through a multi-symbol matched-filter technique, thereby generating a second set of data. The demodulator obtains (806–810) a measurement of a characteristic of the signal, and chooses (814–816) one of the first and second sets of data for output, based upon the measurement.

28 Claims, 5 Drawing Sheets

-PRIOR ART-

METHOD AND APPARATUS IN A WIRELESS RECEIVER FOR DEMODULATING A CONTINUOUS-PHASE FREQUENCY-SHIFT-KEYED SIGNAL

FIELD OF THE INVENTION

This invention relates in general to wireless communication systems, and more specifically to a method and apparatus in a wireless receiver for demodulating a continuous-phase frequency-shift-keyed signal received in a delay spread environment including noise.

BACKGROUND OF THE INVENTION

For additive white Gaussian noise (AWGN) channels, an optimum receiver for an M-ary continuous-phase frequency shift keyed (CPFSK) signal consists of a bank of M matched filters followed by a sequence estimator. For noncoherent receivers, the sequence estimator may be implemented as a multiple-symbol matched filter (MSMF). The MSMF receiver combines outputs from the single-symbol matched filter (SSMF) to achieve optimum AWGN sensitivity. However, delay spread caused by multipath and/or simulcast transmission causes phase discontinuities in the received signal, which can cause the performance of the MSMF to be unacceptable. In such environments, the SSMF still performs well, and is the preferable demodulation technique. Thus, we have a situation in which the MSMF outperforms the SSMF in AWGN channels, while the SSMF outperforms the MSMF in delay spread channels.

What is needed is a method and apparatus in which the receiver can detect the presence of such channel conditions, and choose whether to use single-symbol (SSMF) outputs, or to use the results obtained by combining multiple outputs from the single-symbol correlators (MSMF). Preferably the method and apparatus will not need any feedback from the forward error correction decoder, i.e., the method and apparatus will operate quickly and efficiently on the physical layer.

SUMMARY OF THE INVENTION

An aspect of the present invention is a method in a wireless receiver for demodulating a continuous-phase frequency-shift-keyed signal received in a delay spread environment including noise. The method comprises the steps of demodulating a block of symbols of the signal through a single-symbol matched-filter technique, thereby generating a first set of data; and demodulating the block of symbols through a multi-symbol matched-filter technique, thereby generating a second set of data. The method further comprises the steps of measuring a characteristic of the signal, thereby obtaining a measurement; and choosing one of the first and second sets of data for output, based upon the measurement.

Another aspect of the present invention is a demodulator in a wireless receiver for demodulating a continuous-phase frequency-shift-keyed signal received in a delay spread environment including noise. The demodulator comprises an input interface for receiving the signal, and a processor coupled to the input interface for processing the signal. The demodulator further comprises an output interface for outputting demodulated data. The processor is programmed to demodulate a block of symbols of the signal through a single-symbol matched-filter technique, thereby generating a first set of data; and to demodulate the block of symbols through a multi-symbol matched-filter technique, thereby generating a second set of data. The processor is further programmed to measure a characteristic of the signal, thereby obtaining a measurement; and to choose one of the first and second sets of data for output, based upon said measurement.

Another aspect of the present invention is a wireless receiver for receiving and demodulating a continuous-phase frequency-shift-keyed signal received in a delay spread environment including noise. The wireless receiver comprises a receiver front end for receiving and down-converting the signal to derive a down-converted signal; and a demodulator coupled to the receiver front end for demodulating the down-converted signal. The wireless receiver further comprises a user interface coupled to the demodulator for interfacing with a user. The demodulator comprises an input interface for receiving the down-converted signal, and a processor coupled to the input interface for processing the down-converted signal. The demodulator further comprises an output interface for outputting demodulated data. The processor is programmed to demodulate a block of symbols of the down-converted signal through a single-symbol matched-filter technique, thereby generating a first set of data; and to demodulate the block of symbols through a multi-symbol matched-filter technique, thereby generating a second set of data. The processor is further programmed to measure a characteristic of the down-converted signal, thereby obtaining a measurement; and to choose one of the first and second sets of data for output, based upon said measurement.

DETAILED DESCRIPTION OF THE DRAWINGS

Figure 1:
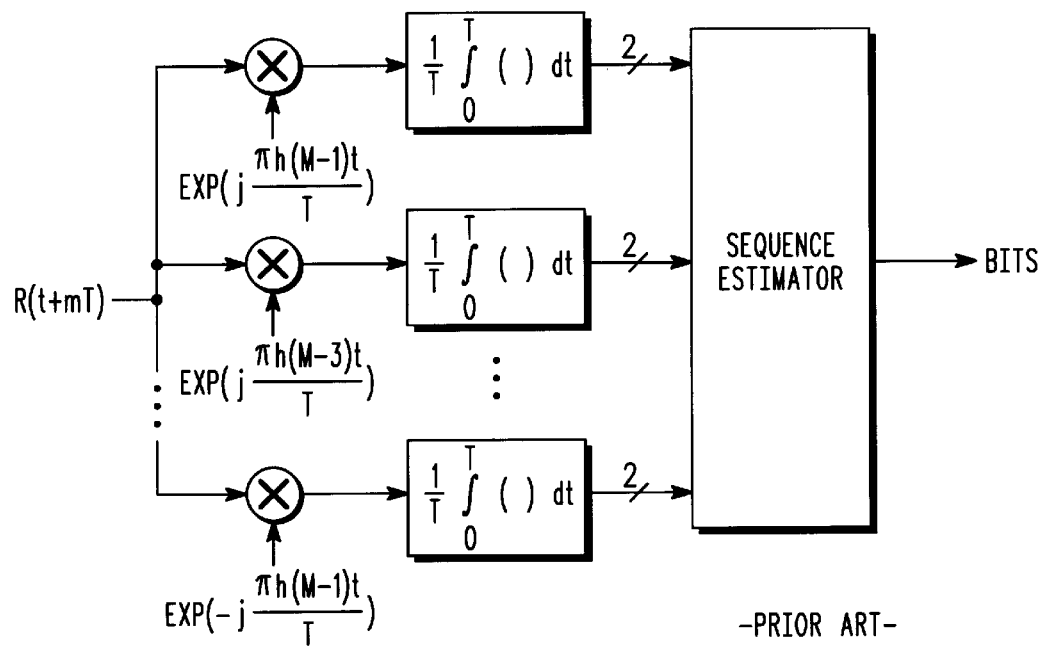
FIG. 1 depicts a prior-art demodulator architecture for multiple-symbol matched detection of an M-ary CPFSK signal.

FIG. 1 depicts a prior-art demodulator architecture for multiple-symbol matched detection of an M-ary CPFSK signal. During the mth symbol interval, of duration T, the received signal R(t+mT) is correlated against M frequencies, producing M complex outputs. The correlation templates depend on the modulation index h, the number of frequencies M, and the symbol duration T. This structure applies to full-response CPFSK, for which the premodulation filter in the CPFSK transmitter causes very little smoothing of the square pulses, as is the case in, for example, the FLEX™ two-way paging forward channel. It should be pointed out, however, that the ideas of this invention also apply to partial-response CPFSK, in which the premodulation filter causes significant smoothing of the baseband pulses, such as in GSM systems. In such a system, the number of correlators is $M^L$, where L is an integer which grows as the smoothing, or memory, of the transmitted pulse increases (L=1 for full-response).

For the full-response receiver shown in FIG. 1, a single-symbol matched filter (SSMF) would simply look at the M correlator outputs and choose the symbol frequency as that which produces the highest correlation. A multiple-symbol matched filter (MSMF) would estimate the received symbols by looking at the sequence of correlator outputs over multiple symbols. The SSMF and MSMF techniques are well known and will not be described further herein, but it should pointed out that the premise of the MSMF technique is that the transmitted signal has continuous phase. By exploiting the memory between the transmitted symbols, the MSMF technique is able to achieve a sensitivity advantage over the SSMF technique.

Figure 2:
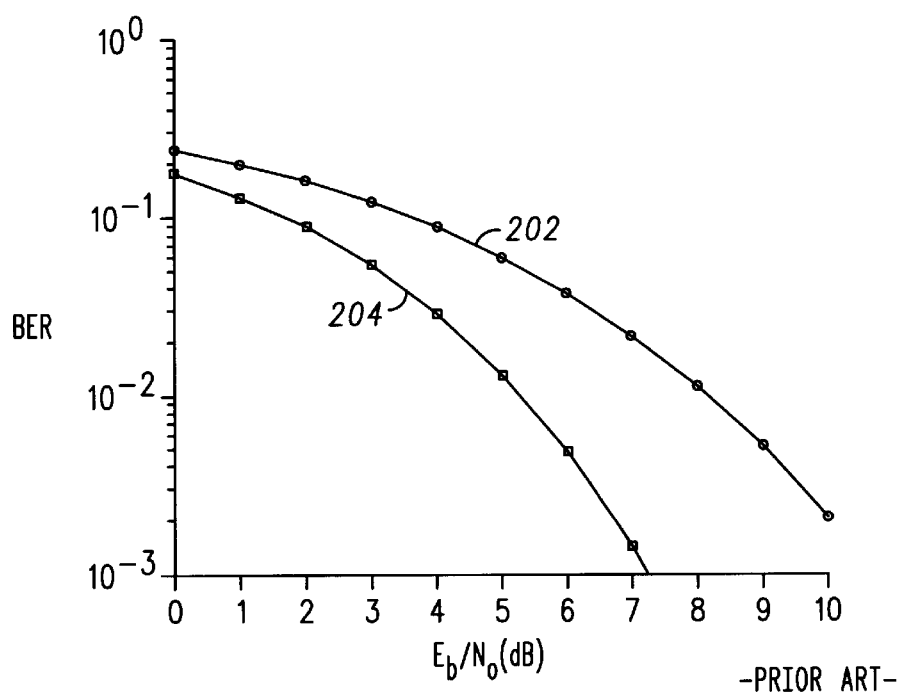
FIG. 2 depicts a sensitivity comparison for prior-art SSMF and MSMF demodulators on an AWGN channel.

FIG. 2 depicts a sensitivity comparison for prior-art SSMF and MSMF demodulators on an AWGN channel for M=4 and h=½, which are the parameters for 6400 bps FLEX two-way paging. Note that the MSMF performance curve 204 has a 3 dB advantage over the SSMF performance curve at 1% BER.

Figure 3:
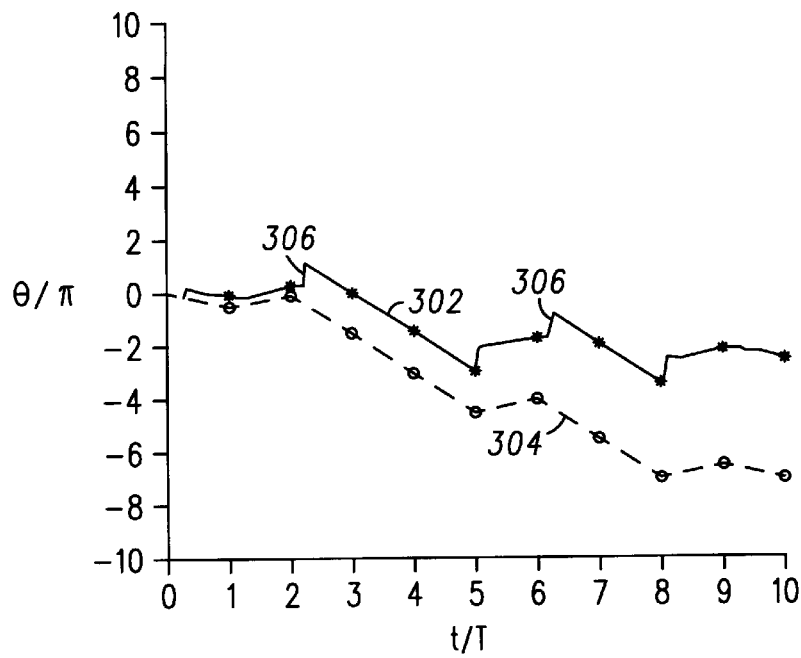
FIG. 3 depicts signal phase trajectories for ideal and ¼ symbol delay spread.

FIG. 3 depicts signal phase trajectories for ideal and ¼ symbol delay spread, using a 2-path model. Note that the ideal-condition phase trajectory 304 is continuous, while the ¼ symbol phase trajectory 302 shows phase discontinuities 306 near the symbol transitions. The MSMF technique tries to coherently combine multiple symbols. However, this is very difficult to do when the phase jumps from symbol to symbol. In this case, the SSMF technique provides better performance than the MSMF technique.

Figure 4:
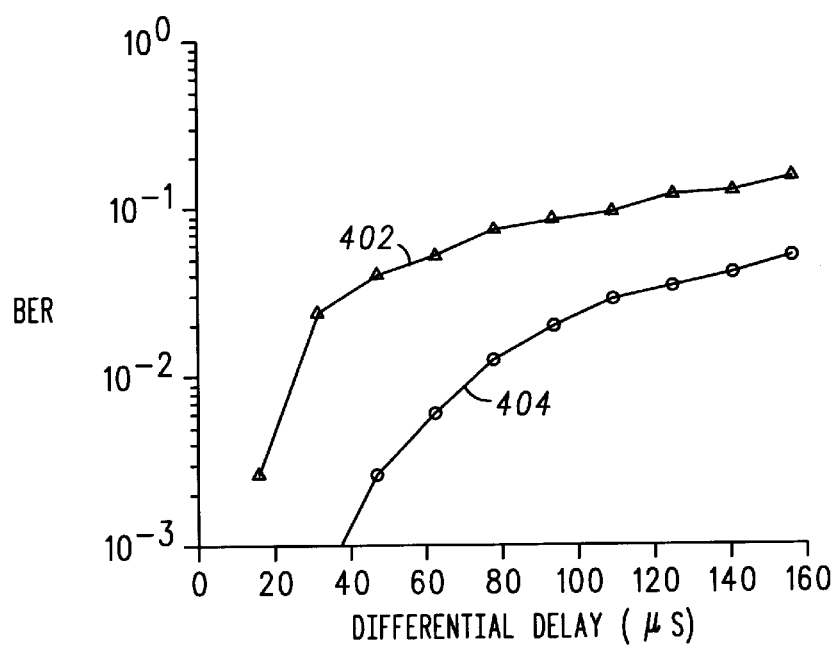
FIG. 4 depicts a simulcast delay comparison for prior-art SSMF and MSMF demodulators at 6400 bps.

FIG. 4 depicts a simulcast delay comparison for prior-art SSMF and MSMF demodulators for a 2-path simulcast channel with high SNR and 1 dB differential power for 6400 bps FLEX two-way paging. At 3% BER (approximate operating point for soft-decision BCH decoding), the SSMF performance curve 404 is good out to 110 uS of differential delay, whereas the MSMF performance curve 402 is good out to only 40 uS. Hence we have a trade-off: the MSMF technique is better for sensitivity (3 dB) on an AWGN channel but unacceptable for simulcast with potentially high differential delay, while the SSMF technique is good for simulcast with high differential delay.

Figure 5:
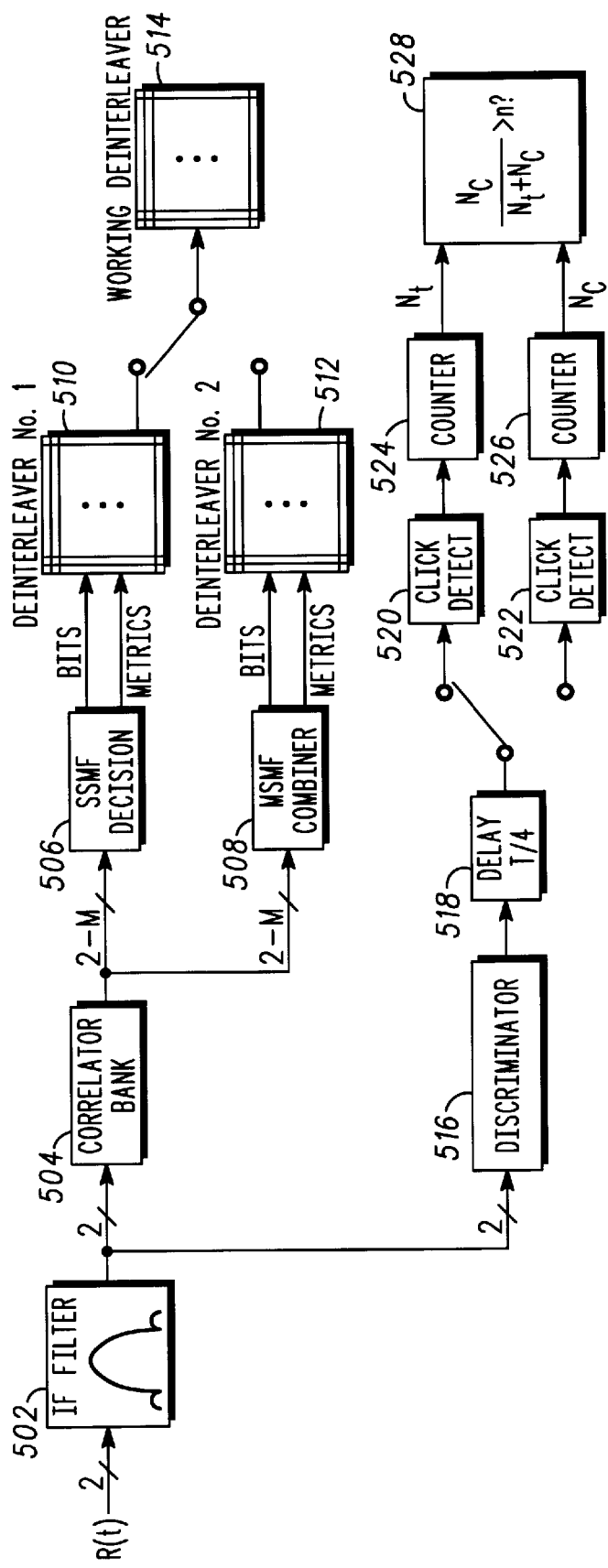
FIG. 5 is an exemplary architecture depicting operational elements of a demodulator in accordance with the present invention.

FIG. 5 is an exemplary architecture depicting operational elements of a demodulator in accordance with the present invention. The received signal R(t) is first passed through an IF selectivity filter 502 to remove adjacent channel interference, since the correlators do not provide sufficient attenuation of the adjacent channel. In this diagram, R(t) is shown to be a continuous-time complex baseband waveform, although it will be appreciated that this signal can be equally represented in discrete time. The filtered signal is then passed through a correlator bank 504 with M correlators, as described previously for full-response signals, thus producing M complex outputs at the end of each symbol interval. The timing of the correlators is controlled by a symbol clock synchronized with the received signal R(t) through well-known techniques.

The correlator outputs are fed into two different blocks: a conventional SSMF decision block 506, and a conventional MSMF combiner block 508. The outputs of these blocks preferably comprise both demodulated bits (for block codes) and bit reliability metrics for soft-decision decoding. It will be appreciated that error correction codes other than block codes, such as convolutional codes, may not require the demodulated bits for soft-decision decoding. These two sets of data outputs are each input to their respective deinterleavers 510, 512. Each deinterleaver fills up over the course of the interleave block, while the working deinterleaver 514 is decoding the previously stored block of data. At the end of the block, a decision is made whether the MSMF or SSMF outputs should be passed to the working deinterleaver for data decoding. Although we have yet to describe how this decision is made, it should be appreciated that we have a well-defined architecture for choosing between two different demodulators, with only a 50% increase in deinterleaver memory size, since a standard deinterleaver uses double buffering, and this system utilizes three buffers. In this description, we are making our decisions (as to which demodulator to choose) once per interleaved block. In the FLEX two-way paging protocol, since the blocks are fairly large (160 msec, 256 or 512 symbols), this is enough time to make a reliable decision, and fits nicely into the deinterleaver architecture. However, in other systems, the deinterleaver block may not be large enough to make a reliable decision, and this architecture would have to be modified to include multiple blocks.

Now we describe the method for choosing the demodulation technique. During simulations, we generated a post-discriminator eye diagram for a FLEX two-way paging signal operating at 6400 bps with 2-path simulcast and 78.125 uS differential delay (¼symbol). This eye diagram used a sweep interval of one symbol, and was synchronized to start ¼ symbol before the edge of the symbol, or equivalently, ¼ symbol after the center of the symbol. With the trigger point ¼ symbol before the symbol edge, it then follows that the interval 0 to T/2 is the region about the transition of the symbol, and the interval T/2 to T is the region about the symbol center. We then noted that, in this simulcast environment, we encountered several "clicks" (i.e., abnormally large deviations in instantaneous frequency) in the region about the symbol transition, and no clicks in the region about the symbol center. (These frequency clicks correspond to the phase discontinuities 306 illustrated in FIG. 3.) Thus, we realized that if we could detect this condition and switch demodulation techniques accordingly, we would have the desired solution.

Referring again to FIG. 5, the IF filter output is passed through an FM discriminator 516, which measures the rate of change in the phase, i.e., the instantaneous frequency, of the IF filter output. The discriminator output is delayed by ¼ symbol in delay element 518 so that the symbol transition region starts at the rising edge of the symbol clock, and the symbol center region starts ½ symbol after the rising edge of the symbol clock. During each symbol transition region, a first click detection block 520 checks whether a threshold is exceeded, and outputs a corresponding 1 or 0 each symbol time. Similarly, a second click detection block 522 checks for clicks in the symbol-center region, and also outputs a corresponding 1 or 0 each symbol time. For the FLEX two-way paging protocol, a click threshold of ±6400 Hz preferably is used. A first counter 524 keeps track of the number of transition clicks $N_t$, while a second counter 526 keeps track of the number of center clicks $N_c$ over the course of the block. At the end of the block, a decision 528 is made by looking at the ratio of symbol-center clicks to total clicks, and then comparing the ratio to a threshold η. If the ratio is low, we are in delay spread conditions, and the SSMF technique is chosen. If the ratio is not low, we are in a noise or interference environment, and the MSMF technique is chosen. The counters 524, 526 are reset after the block is over, so that decisions are made on a block-by-block basis.

Simulations were run on the demodulator architecture of FIG. 5 for a variety of channel conditions, using a threshold of $\eta=0.475$. The simulations demonstrated that the demodulator architecture in accordance with the present invention is very effective at selecting the better demodulation technique, especially at higher BERs, where proper selection is the most important.

An alternative embodiment is possible which advantageously does not require additional deinterleaver memory. Assume we have two deinterleavers, Buffer #1 and Buffer #2, i.e., similar to the prior-art double buffer arrangement. During Block 0 of the FLEX two-way protocol frame, the SSMF would fill up Buffer #1, while the MSMF would fill up Buffer #2. After Block 0 is complete, a decision as to which demodulator is preferred is available. If the SMSF technique is preferred, then we can start filling Buffer #2 and decoding Buffer #1; else, if the MSMF technique is preferred, we can decode Buffer #2 and start filling Buffer #1, and so on. Once the decision based on the Block 0 signal has been made, we use that decision for the rest of the frame. The only disadvantage this embodiment has over the preferred embodiment of FIG. 5 is that the signal of Block 0 is used to choose the demodulation technique for Blocks 1 through 10-a period of 1.76 seconds. If the delay spread conditions change drastically due to log-normal shadowing or Rayleigh fading, then the decision from Block 0 may no longer be the best.

Figure 6:
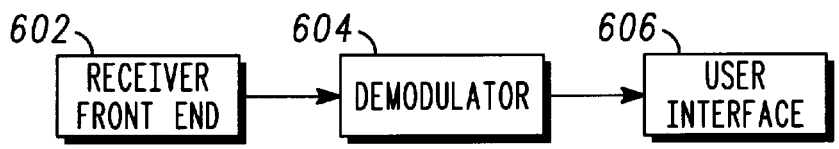
FIG. 6 is an exemplary electrical block diagram of a receiver in accordance with the present invention.

FIG. 6 is an exemplary electrical block diagram of a wireless receiver 600 in accordance with the present invention. The wireless receiver 600 comprises a conventional receiver front end 602 for receiving and down-converting a continuous-phase frequency-shift-keyed signal to derive a down-converted signal. The wireless receiver 600 further comprises a demodulator 604 coupled to the receiver front end 602 for demodulating the down-converted signal. In addition, the wireless receiver 600 includes a user interface 606, e.g., conventional control buttons and display, coupled to the demodulator 604 for interfacing with a user.

Figure 7:
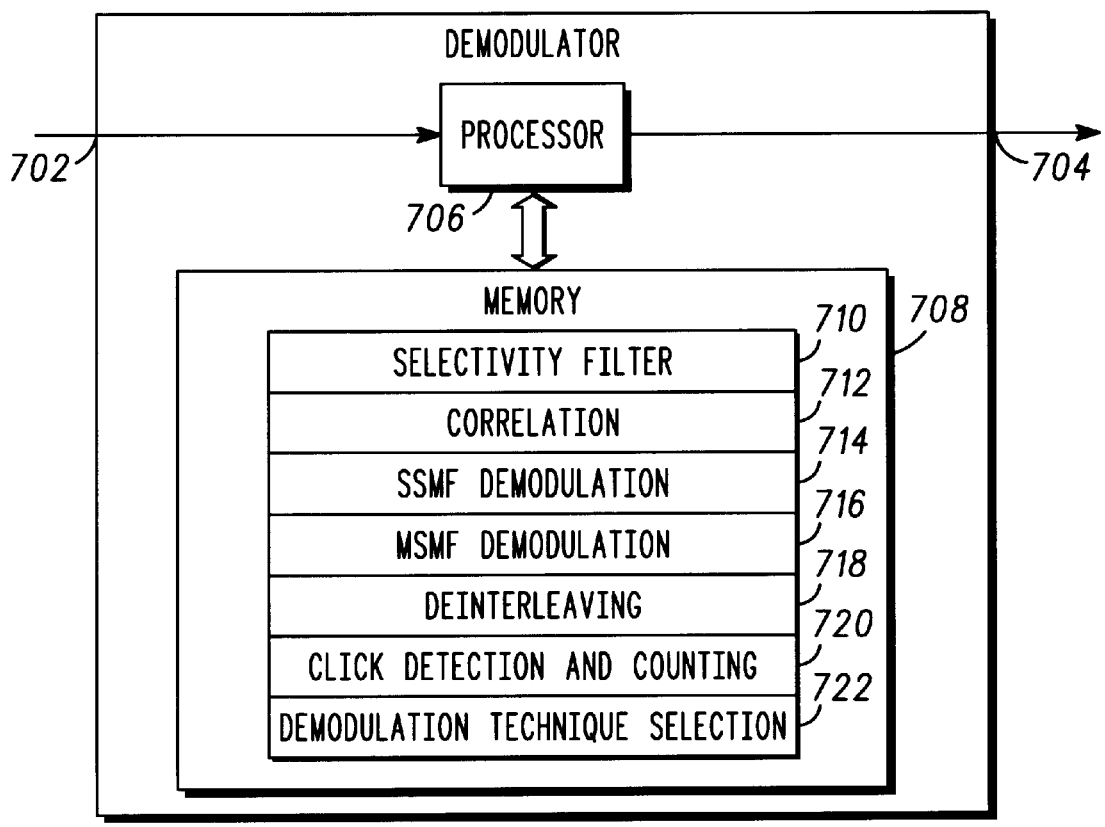
FIG. 7 is an exemplary electrical block diagram of a practical embodiment of the demodulator in accordance with the present invention.

FIG. 7 is an exemplary electrical block diagram of a practical embodiment of the demodulator 604 in accordance with the present invention. The demodulator 604 comprises a conventional input interface 702 for receiving the down-converted signal. The demodulator 604 further comprises a processor 706 coupled to the input interface 702 for processing the down-converted signal. The demodulator 604 also includes a conventional output interface 704 coupled to the processor 706 for outputting demodulated data. In addition, the demodulator 604 includes a conventional memory 708 coupled to the processor 706 for storing operating variables and software for programming the processor 706 in accordance with the present invention. The processor 706 is preferably a conventional digital signal processor (DSP), such as the DSP1615 processor manufactured by Lucent Technologies, and executes software readily written by one of ordinary skill in the art, given the teachings of the instant disclosure. It will be appreciated that, alternatively, other similar DSPs can be substituted for the DSP1615. It will be further appreciated that, alternatively, some or all of the demodulator 604 can be realized in hardware instead of through software programming of the processor 706 and, in addition, that the memory 708 can be integral to the processor 706.

The memory 708 comprises a conventional selectivity filter program 710 for programming the processor 706 to filter the down-converted signal to remove adjacent channel interference. The memory 708 further comprises a conventional correlation program 712 for programming the processor 706 to process the signal through a predetermined number of correlators corresponding to the number of symbol frequencies. The memory 708 also includes a conventional SSMF demodulation program 714 for programming the processor 706 to demodulate the signal using an SSMF technique, thereby generating a first set of data. In addition, the memory 708 includes a conventional MSMF demodulation program 716 for programming the processor 706 to demodulate the signal using an MSMF technique, thereby generating a second set of data. The memory 708 further comprises a deinterleaving section 718 including a deinterleaving storage space and a deinterleaving program for programming the processor 706 to deinterleave the demodulated data through well-known techniques. The memory 708 also includes a click detection and counting program 720 for programming the processor 706 to detect transition clicks and center clicks, and to count both in accordance with the present invention. The counts allow the processor 706 to determine a level of delay-spread distortion (transition clicks) relative to noise-caused distortion (total clicks). In addition, the memory 708 includes a demodulation technique selection program 722 for programming the processor 706 to choose one of the first and second sets of data based upon the ratio of the number of center clicks and the number of total clicks for a block of data, in accordance with the present invention.

Figure 8:
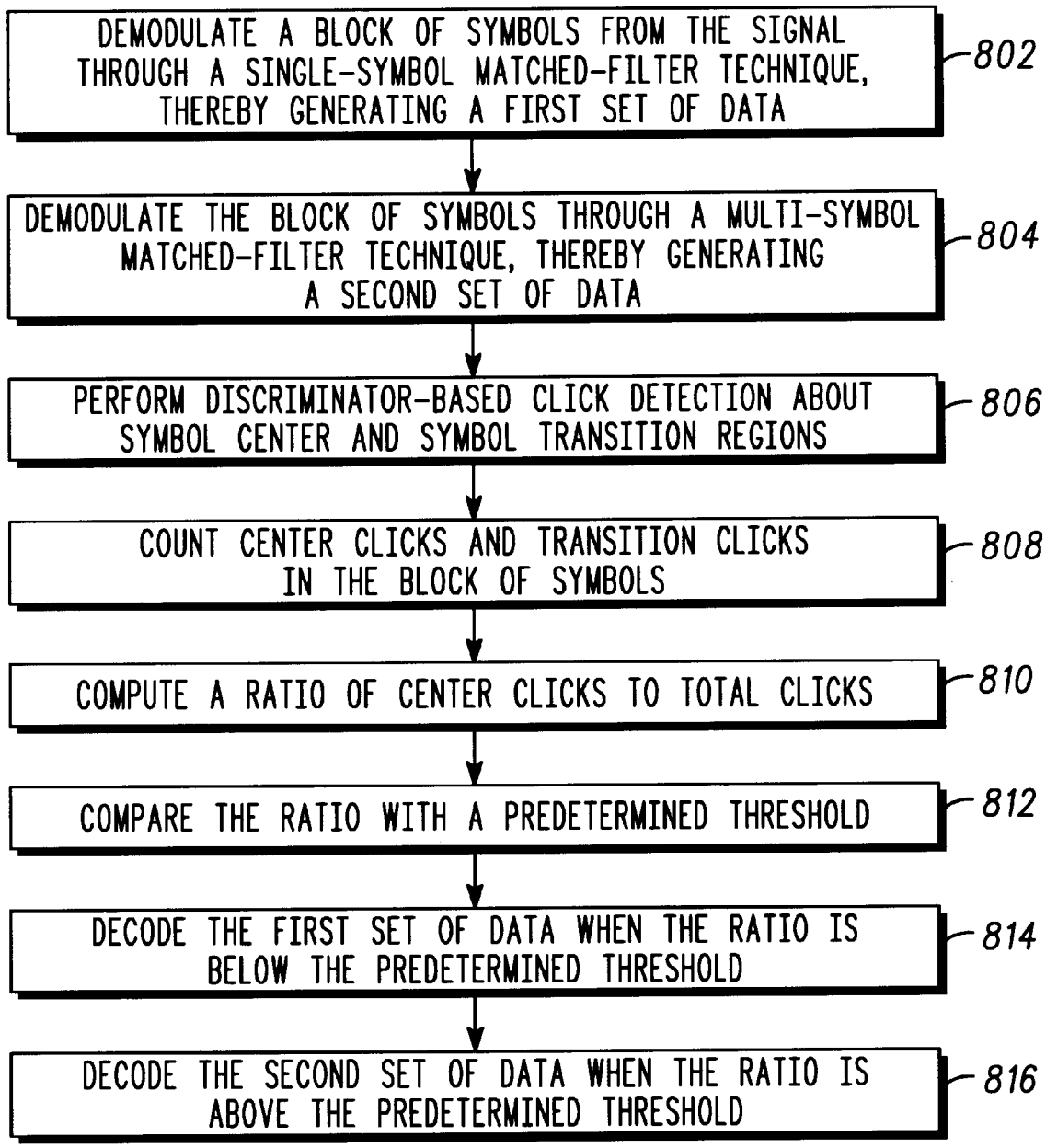
FIG. 8 is a flow diagram summarizing operation of the demodulator in accordance with the present invention.

FIG. 8 is a flow diagram summarizing operation of the demodulator 604 in accordance with the present invention. The flow begins when the demodulator 604 demodulates 802 a block of symbols from the signal through a SSMF technique, thereby generating a first set of data. Simultaneously, the demodulator 604 demodulates 804 the block of symbols through a MSMF technique, thereby generating a second set of data. Also simultaneously, the demodulator 604 performs 806 discriminator-based click detection about the symbol center and the symbol transition regions. The demodulator 604 counts 808 the center clicks and transition clicks in the block of symbols as they are detected. At the end of the block of symbols, the demodulator 604 computes 810 the ratio of center clicks to total clicks, and compares 812 the ratio with a predetermined threshold. The demodulator 604 then decodes 814 the first set of data when the ratio is below the predetermined threshold, and decodes 816 the second set of data when the ratio is above the predetermined threshold. In this manner, the present invention advantageously selects an optimum demodulation technique for the existing channel conditions, thereby maximizing sensitivity.

Thus, it should be clear from the preceding disclosure that the present invention advantageously provides a method and apparatus in which the receiver can measure selected channel conditions, and choose whether to use single-symbol (SSMF) outputs, or to use the results obtained by combining multiple outputs from the single-symbol correlators (MSMF). Advantageously, the method and apparatus does not require any feedback from the forward error correction decoder, but instead operates quickly and efficiently on the physical layer, thereby minimizing processing requirements and latency. Many modifications and variations of the present invention are possible in light of the above teachings. Thus, it is to be understood that, within the scope of the appended claims, the invention can be practiced other than as specifically described herein above.

What is claimed is:

1. A method in a wireless receiver for demodulating a continuous-phase frequency-shift-keyed signal received in a delay spread environment including noise, the method comprising the steps of:
   demodulating a block of symbols of the signal through a single-symbol matched-filter technique, thereby generating a first set of data;
   demodulating the block of symbols through a multi-symbol matched-filter technique, thereby generating a second set of data;
   measuring a characteristic of the signal, thereby obtaining a measurement; and
   choosing one of the first and second sets of data for output, based upon said measurement.

2. The method of claim 1, wherein the measuring step comprises the step of measuring the signal to determine a level of delay-spread distortion relative to noise caused distortion.

3. The method of claim 1, wherein the measuring step comprises the step of utilizing discriminator-based click detection about symbol center and symbol transition regions to obtain said measurement.

4. The method of claim 1,
   wherein the signal comprises a plurality of blocks of symbols, and
   wherein the method further comprises the steps of:
      utilizing a triple-buffered deinterleaving architecture; and
      deciding which demodulation technique to use on a block by block basis.

5. The method of claim 1,
   wherein the signal comprises a plurality of blocks of symbols in a frame including a first block, and
   wherein the method further comprises the steps of:
      utilizing a double-buffered deinterleaving architecture; and
      deciding which demodulation technique to use for the frame, based upon the first block.

6. The method of claim 1, wherein the measuring step comprises the steps of:
   determining first and second instantaneous frequencies of the signal during symbol center and symbol transition regions;
   comparing the first and second instantaneous frequencies with a threshold; and
   advancing one of corresponding first and second click counters when one of the first and second instantaneous frequencies exceeds the threshold.

7. The method of claim 1, wherein the measuring step comprises the steps of:
   counting center clicks and transition clicks in the block of symbols;
   computing a ratio of center clicks to total clicks;
   comparing said ratio with a predetermined threshold;
   decoding the first set of data when said ratio is below said predetermined threshold; and
   decoding the second set of data when said ratio is above said predetermined threshold.

8. A demodulator in a wireless receiver for demodulating a continuous-phase frequency-shift-keyed signal received in a delay spread environment including noise, the demodulator comprising:
   an input interface for receiving the signal;
   a processor coupled to the input interface for processing the signal; and
   an output interface for outputting demodulated data,
   wherein the processor is programmed to:
      demodulate a block of symbols of the signal through a single-symbol matched-filter technique, thereby generating a first set of data;
      demodulate the block of symbols through a multi-symbol matched-filter technique, thereby generating a second set of data;
      measure a characteristic of the signal, thereby obtaining a measurement; and
      choose one of the first and second sets of data for output, based upon said measurement.

9. The demodulator of claim 8, wherein the processor is further programmed to measure the signal to determine a level of delay-spread distortion relative to noise-caused distortion.

10. The demodulator of claim 8, wherein the processor is further programmed to utilize discriminator-based click detection about symbol center and symbol transition regions to obtain said measurement.

11. The demodulator of claim 8,
    wherein the signal comprises a plurality of blocks of symbols, and
    wherein the processor is further programmed to:
       utilize a triple-buffered deinterleaving architecture; and
       decide which demodulation technique to use on a block by block basis.

12. The demodulator of claim 8,
    wherein the signal comprises a plurality of blocks of symbols in a frame including a first block, and
    wherein the processor is further programmed to:
       utilize a double-buffered deinterleaving architecture; and
       decide which demodulation technique to use for the frame, based upon the first block.

13. The demodulator of claim 8, wherein the processor is further programmed to:
    determine first and second instantaneous frequencies of the signal during symbol center and symbol transition regions;
    compare the first and second instantaneous frequencies with a threshold; and
    advance one of corresponding first and second click counters when the of the first and second instantaneous frequencies exceeds the threshold.

14. The demodulator of claim 8, wherein the processor is further programmed to:
    count center clicks and transition clicks in the block of symbols;
    compute a ratio of center clicks to total clicks;
    compare said ratio with a predetermined threshold;
    decode the first set of data when said ratio is below said predetermined threshold; and
    decode the second set of data when said ratio is above said predetermined threshold.

15. A wireless receiver for receiving and demodulating a continuous-phase frequency-shift-keyed signal received in a delay spread environment including noise, the wireless receiver comprising:
    a receiver front end for receiving and down-converting the signal to derive a down-converted signal;
    a demodulator coupled to the receiver front end for demodulating the down-converted signal; and a user interface coupled to the demodulator for interfacing with a user, wherein the demodulator comprises:
an input interface for receiving the down-converted signal;
a processor coupled to the input interface for processing the downconverted signal; and
an output interface for outputting demodulated data, and
wherein the processor is programmed to:
demodulate a block of symbols of the down-converted signal through a single-symbol matched-filter technique, thereby generating a first set of data;
demodulate the block of symbols through a multi-symbol matched-filter technique, thereby generating a second set of data;
measure a characteristic of the down-converted signal, thereby obtaining a measurement; and
choose one of the first and second sets of data for output, based upon said measurement.

16. The wireless receiver of claim 15, wherein the processor is further programmed to measure the down-converted signal to determine a level of delay-spread distortion relative to noise-caused distortion.

17. The wireless receiver of claim 15, wherein the processor is further programmed to utilize discriminator-based click detection about symbol center and symbol transition regions to obtain said measurement.

18. The wireless receiver of claim 15,
wherein the down-converted signal comprises a plurality of blocks of symbols, and
wherein the processor is further programmed to:
utilize a triple-buffered deinterleaving architecture; and
decide which demodulation technique to use on a block by block basis.

19. The wireless receiver of claim 15,
wherein the down-converted signal comprises a plurality of blocks of symbols in a frame including a first block, and
wherein the processor is further programmed to:
utilize a double-buffered deinterleaving architecture; and
decide which demodulation technique to use for the frame, based upon the first block.

20. The wireless receiver of claim 15, wherein the processor is further programmed to:
determine first and second instantaneous frequencies of the down-converted signal during symbol center and symbol transition regions;
compare the first and second instantaneous frequencies with a threshold; and
advance one of corresponding first and second click counters when one of the first and second instantaneous frequencies exceeds the threshold.

21. The wireless receiver of claim 15, wherein the processor is further programmed to:
count center clicks and transition clicks over the block of symbols;
compute a ratio of center clicks to total clicks;
compare said ratio with a predetermined threshold;
decode the first set of data when said ratio is below said predetermined threshold; and
decode the second set of data when said ratio is above said predetermined threshold.

22. A method in a wireless receiver for demodulating a continuous-phase frequency-shift-keyed signal received in a delay spread environment including noise, the method comprising the steps of:
demodulating a block of symbols of the signal by choosing a symbol frequency that produces a highest correlation from a number of correlator outputs, thereby generating a first set of data;
demodulating the block of symbols by choosing a symbol frequency that produces the highest correlation from a sequence of the number of correlator outputs over multiple symbols, thereby generating a second set of data;
measuring a characteristic of the signal, thereby obtaining a measurement; and
choosing one of the first and second sets of data for output, based upon said measurement.

23. The method of claim 22, wherein the measuring step comprises the step of measuring the signal to determine a level of delay-spread distortion relative to noise-caused distortion.

24. The method of claim 22, wherein the measuring step comprises the step of utilizing discriminator-based click detection about symbol center and symbol transition regions to obtain said measurement.

25. The method of claim 22,
wherein the signal comprises a plurality of blocks of symbols, and
wherein the method further comprises the steps of:
utilizing a triple-buffered deinterleaving architecture; and
deciding which demodulation technique to use on a block by block basis.

26. The method of claim 22,
wherein the signal comprises a plurality of blocks of symbols in a frame including a first block, and
wherein the method further comprises the steps of:
utilizing a double-buffered deinterleaving architecture; and
deciding which demodulation technique to use for the frame, based upon the first block.

27. The method of claim 22, wherein the measuring step comprises the steps of:
determining first and second instantaneous frequencies of the signal during symbol center and symbol transition regions;
comparing the first and second instantaneous frequencies with a threshold; and
advancing one of corresponding first and second click counters when one of the first and second instantaneous frequencies exceeds the threshold.

28. The method of claim 22, wherein the measuring step comprises the steps of:
counting center clicks and transition clicks in the block of symbols;
computing a ratio of center clicks to total clicks;
comparing said ratio with a predetermined threshold;
decoding the first set of data when said ratio is below said predetermined threshold; and
decoding the second set of data when said ratio is above said predetermined threshold.

* * * * *